Dec. 6, 1949　　　W. H. ARMISTEAD　　　2,490,331
OPTICAL GLASS
Filed Nov. 9, 1945
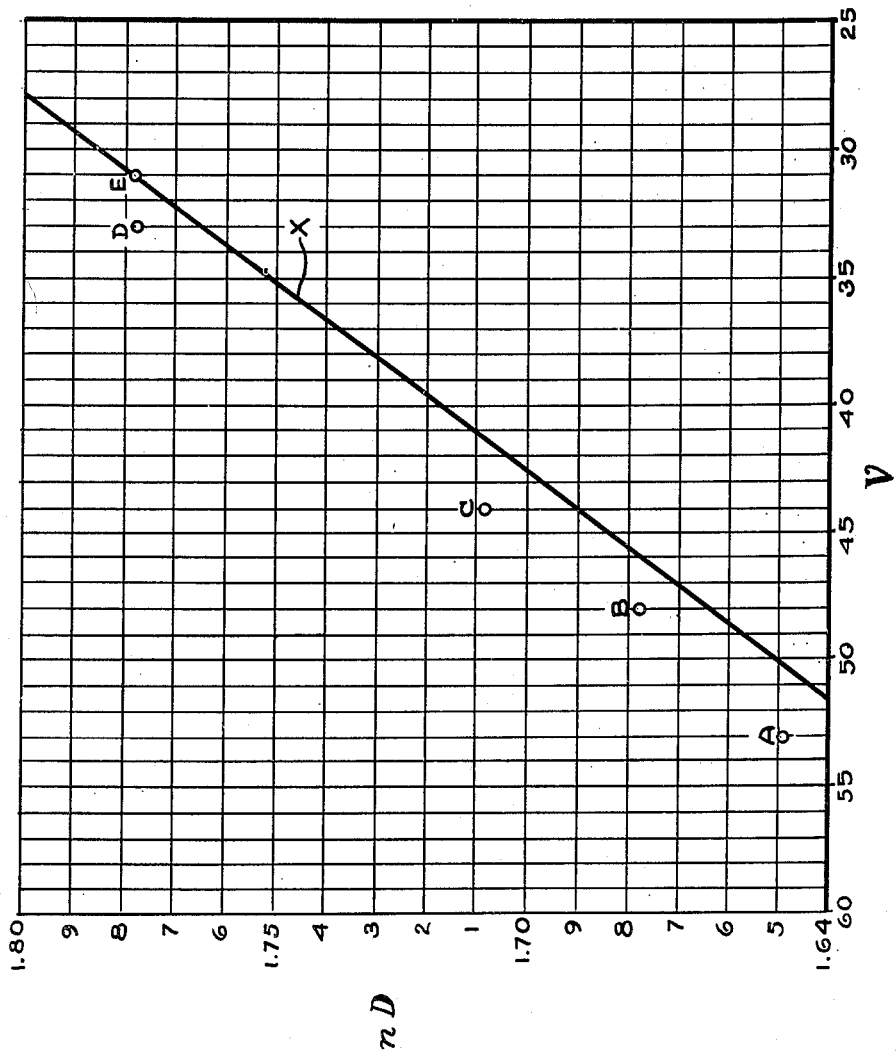
Inventor
WILLIAM H. ARMISTEAD
By Knight Fowler
Attorneys Patented Dec. 6, 1949

2,490,331

UNITED STATES PATENT OFFICE 2,490,331

OPTICAL GLASS

William H. Armistead, Corning, N. Y., assignor to Corning Glass Works, Corning, N. Y., a corporation of New York Application November 9, 1945, Serial No. 627,747

7 Claims. (Cl. 106—53)

This invention relates to optical glasses and particularly to the optical glasses known as dense barium crowns which have a high barium content. Such glasses ordinarily have a maximum index of refraction for the D line ($n_D$) of about 1.63. They also have a very high dispersive index ($v$). This combination of optical properties makes the barium crowns very useful for the production of lenses of various kinds.

For some purposes it is desirable to use glasses having higher refractive indices, up to about 1.8, and also having high dispersive indices. The refractive index of barium crown glasses has been limited to a maximum of about 1.63 because an increase in the barium content beyond this point, about 50% BaO, results in devitrification of the glass when it is slowly cooled or reheated for molding.

The primary object of this invention is to provide transparent optical glasses which have refractive indices ($n_D$) greater than 1.64 together with high dispersive indices ($v$).

Another object is to provide barium crown glasses which contain over 50% and up to 70% BaO and which will not devitrify when reheated or slowly cooled.

Another object is to prevent the devitrification of barium crown glasses having barium contents above 50% BaO.

Another object is to provide glasses which have refractive indices greater than 1.64, and preferably greater than 1.675 and correspondingly high dispersive indices, and which contain a total of at least 60%, and preferably at least 65% BaO and PbO.

I have found that the introduction of substantial percentages of lead amounting to at least 5% PbO into dense barium crown glasses prevents devitrification of the glass whereby the barium content can be increased to as much as about 70% BaO with a corresponding gain in refractive index, provided that the glass also contains substantial $B_2O_3$, $SiO_2$, and preferably at least one of the refractory oxides $Al_2O_3$ or $ZrO_2$. The introduction of PbO also tends to raise the refractive index of the glass and does not lower the dispersive index objectionably, provided that the barium content is at least 50% BaO. For the accomplishment of my purpose it is necessary that the total BaO and PbO be at least 60%.

I am aware that glasses containing both BaO and PbO have heretofore been made as optical glasses and for other purposes, but such prior glasses do not contain more than about 40% BaO, at the most and do not have the desirable optical properties of my new glasses. Moreover, it was not hitherto known that the barium content can be increased beyond 50% BaO without devitrification when at least 5% of PbO is present.

In my co-pending application, Serial Number 627,746 filed concurrently herewith, I have disclosed and claimed optical glasses having high refractive indices and high dispersive indices and containing BaO, PbO and CdO. It is therein shown that the introduction of CdO not only prevents devitrification of the glass but also is of benefit for producing a high refractive index and high dispersive index. The glasses of the present invention are distinguished from the glasses of my co-pending application in that the present glasses are cadium-free.

In accordance with the objects of the present invention, the glasses should contain from 2% to 25% of $SiO_2$ and from 5% to 37% $B_2O_3$. Preferably they should also contain $Al_2O_3$ or $ZrO_2$, or both. The $Al_2O_3$ aids in preventing devitrification and may amount to from 1% to 12%. The $ZrO_2$, being less soluble, may amount to from 1% to 7%. It also aids in preventing devitrification and also helps to raise both the refractive index and the dispersive index. Although not particularly desirable, small percentages of the alkali metal oxides ($R_2O$) and other oxides which are commonly used in optical glass compositions such as BeO, CaO, SrO, ZnO, $As_2O_3$, $Sb_2O_3$, $TiO_2$, etc., may also be included in the new glasses but preferably should not exceed a total of about 5%.

The following glasses, which are given in percent by weight as calculated from their respective batches, show by way of example compositions which I have melted and which fall within the scope of my invention:

|  | A | B | C | D | E |
|---|---|---|---|---|---|
| $SiO_2$ | 20 | 10 | 9 | 10 | 8 |
| BaO | 55 | 65 | 60 | 50 | 50 |
| PbO | 5 | 5 | 10 | 25 | 30 |
| $B_2O_3$ | 15 | 15 | 17 | 10 | 10 |
| $Al_2O_3$ | 5 | 5 | | | 2 |
| $ZrO_2$ | | | 4 | 5 | |
| $n_D$ | 1.6492 | 1.6774 | 1.7085 | 1.7774 | 1.7778 |
| $v$ | 53 | 48 | 44 | 33 | 31 |

The above glasses are chemically stable and resistant to devitrification. It will be noted that they have refractive indices falling within the range of 1.64 to 1.80 and relatively high dispersive indices. Glasses B, C, D and E are particularly suitable for my purpose.

To illustrate the relationship between $n_D$ and $v$ for the glasses of this invention, reference is had to the accompanying drawing which is a diagram representing the values of $n_D$ for the above glasses plotted against their respective values of $v$ and designated by the letters of the respective glasses. It will be noted that the values for the various glasses are above the line X which represents the approximate minima in the values for $n_D$ and $v$ which characterize the glasses of this invention.

The line X is drawn through the points ($n_D=1.65$, $v=50$) and ($n_D=1.75$, $v=35$) and is defined by the equation $$v = 297.5 - 150\, n_D$$

I claim:

1. A transparent cadmium-free optical glass which contains 50% to 70% BaO, 5% to 30% PbO, 2% to 25% $SiO_2$ and 5% to 37% $B_2O_3$, the sum of which is more than 95% of the total composition, the total BaO and PbO being not less than 60%, and which has an index of refraction for the D line ($n_D$) of at least 1.64 and a dispersive index ($v$) greater than $v=297.5-150\, n_D$.

2. A transparent cadmium-free optical glass which contains 50% to 70% BaO, 5% to 30% PbO, 2% to 25% $SiO_2$, 5% to 37% $B_2O_3$, and 1% to 12% $Al_2O_3$, the sum of which is more than 95% of the total composition, the total BaO and PbO being not less than 60%, and which has an index of refraction for the D line ($n_D$) of at least 1.64 and a dispersive index ($v$) greater than $$v = 297.5 - 150\, n_D$$

3. A transparent cadmium-free optical glass which contains 50% to 70% BaO, 5% to 30% PbO, 2% to 25% $SiO_2$, 5% to 37% $B_2O_3$ and 1% to 7% $ZrO_2$, the sum of which is more than 95% of the total composition, the total BaO and PbO being not less than 60%, and which has an index of refraction for the D line ($n_D$) of at least 1.64 and a dispersive index ($v$) greater than $$v = 297.5 - 150\, n_D$$

4. A transparent cadmium-free optical glass which contains 50% to 70% BaO, 5% to 30% PbO, 2% to 25% $SiO_2$, 5% to 37% $B_2O_3$ and 1% to 12% $Al_2O_3$ and 1% to 7% $ZrO_2$, the sum of which is more than 95% of the total composition, the total BaO and PbO being not less than 60%, and which has an index of refraction for the D line ($n_D$) of at least 1.64 and a dispersive index ($v$) greater than $v=297.5-150\, n_D$.

5. A transparent cadmium-free optical glass which consists of 50% to 70% BaO, 5% to 30% PbO, 2% to 25% $SiO_2$, 5% to 37% $B_2O_3$ and 1% to 12% $Al_2O_3$, the total BaO and PbO being not less than 60%, and which has an index of refraction for the D line ($n_D$) of at least 1.64 and a dispersive index ($v$) greater than $$v = 297.5 - 150\, n_D$$

6. A transparent cadmium-free optical glass which consists of 50% to 70% BaO, 5% to 30% PbO, 2% to 25% $SiO_2$, 5% to 37% $B_2O_3$ and 1% to 7% $ZrO_2$, the total BaO and PbO being not less than 60%, and which has an index of refraction for the D line ($n_D$) of at least 1.64 and a dispersive index ($v$) greater than $v=297.5-150\, n_D$.

7. A transparent optical glass which consists of approximately 9% $SiO_2$, 60% BaO, 10% PbO, 17% $B_2O_3$ and 4% $ZrO_2$.

WILLIAM H. ARMISTEAD.

REFERENCES CITED

The following references are of record in the file of this patent:

UNITED STATES PATENTS

| Number | Name | Date |
|---|---|---|
| 1,513,923 | Montgomery | Nov. 4, 1924 |
| 2,297,453 | Berger et al. | Sept. 29, 1942 |

FOREIGN PATENTS

| Number | Country | Date |
|---|---|---|
| 388,118 | Great Britain | 1933 |
| 596,513 | Germany | 1934 |